(12) United States Patent
Bailey et al.

(10) Patent No.: US 12,356,047 B2
(45) Date of Patent: Jul. 8, 2025

(54) METHOD AND SYSTEM FOR MULTI-DIMENSIONAL SEARCHING OF VIDEO CONTENT VIA AN INTERACTIVE GRID MATRIX

(71) Applicants: Christopher Bailey, Ojai, CA (US); Charles Lee Hamilton, Fort Bragg, CA (US)

(72) Inventors: Christopher Bailey, Ojai, CA (US); Charles Lee Hamilton, Fort Bragg, CA (US)

(73) Assignee: INTENSION Inc., Ojai, CA (US)

( * ) Notice: Subject to any disclaimer, the term of this patent is extended or adjusted under 35 U.S.C. 154(b) by 0 days.

(21) Appl. No.: 17/945,746

(22) Filed: Sep. 15, 2022

(65) Prior Publication Data

US 2024/0348887 A1 Oct. 17, 2024

Related U.S. Application Data

(60) Provisional application No. 63/276,629, filed on Nov. 7, 2021.

(51) Int. Cl.
*H04N 21/482* (2011.01)
*H04N 21/431* (2011.01)
*H04N 21/854* (2011.01)

(52) U.S. Cl.
CPC ..... *H04N 21/4821* (2013.01); *H04N 21/4314* (2013.01); *H04N 21/854* (2013.01)

(58) Field of Classification Search
CPC .. H04N 21/4312; H04N 21/47; H04N 21/482; H04N 21/816
See application file for complete search history.

(56) References Cited

U.S. PATENT DOCUMENTS

| | | | |
|---|---|---|---|
| 11,374,756 B1* | 6/2022 | Myers | H04L 9/3213 |
| 2003/0126601 A1* | 7/2003 | Roberts | H04N 21/454 725/135 |
| 2012/0054797 A1* | 3/2012 | Skog | H04N 21/4314 725/41 |
| 2013/0283318 A1* | 10/2013 | Wannamaker | H04N 21/23424 725/56 |
| 2014/0259072 A1* | 9/2014 | Chuang | H04N 21/4314 725/44 |
| 2017/0193417 A1* | 7/2017 | Syed | G06Q 10/087 |
| 2022/0312059 A1* | 9/2022 | Laul | G06F 21/1063 |
| 2022/0319173 A1* | 10/2022 | Ricciardi | G06V 20/46 |

* cited by examiner

*Primary Examiner* — Jason Salce

(57) ABSTRACT

In a method and system for performing a multi-dimensional search of video content accessible by a viewer thereof is described. Namely, a grid matrix is populated or filled out, by automation or viewer selection on a smart device, with video content. The grid matrix is organized in a conventional 2D nature (column by row) with chapter names of the video content and sub-chapter names associated with each chapter. A third dimension is provided within each subchapter, namely the inclusion of containers (or drawers) of video content associated for each subchapter name. Within each container is included one or a plurality of nodes of video snippets associated with that container within its given subchapter. The viewer can conduct a multi-dimensional search of video content across all three dimensions of the grid matrix, or via a structured drill-down to search all nodes of a given container.

19 Claims, 13 Drawing Sheets

METHOD AND SYSTEM FOR MULTI-DIMENSIONAL SEARCHING OF VIDEO CONTENT VIA AN INTERACTIVE GRID MATRIX

CROSS-REFERENCE TO RELATED APPLICATION

The present application claims priority under 35 U.S.C. 119(e) to commonly-assigned U.S. Provisional Patent Application Ser. No. 63/276,629 to Bailey, et al., filed Nov. 7, 2021, the entire contents of which is hereby incorporated by reference herein.

BACKGROUND

Field

The example embodiments in general are directed to a method and system for a multi-dimensional search of video content utilizing a grid matrix.

Related Art

Applicant has been involved in developing intra-program navigation technologies for video content for over fifteen (15) years. Applicant's initial U.S. Pat. No. 7,669,128, entitled "METHODS OF ENHANCING MEDIA CONTENT NARRATIVE", (the "'128 patent") was directed to a system and method which formatted content, such as for intra-program navigation, in a completely different way—a displayed row-by-column, two-dimensional (2D) navigation grid matrix that has a formatted organization between chapters (forming columns) and sub-chapters (forming rows and related to or tied to the columns). The chapter/sub-chapter organization of the navigation grid described in the '128 patent facilitated a user's ability to select their own navigation path through many selectable alternative scenes (that are not fixed or tied to a particular decision). The user selections would be stored in a desired sequence as a digital file, to be played back as a modified version of the video program being viewed.

Applicant built on this initial technology by developing the back end of the system, embodied in its second U.S. Pat. No. 9,177,603, entitled "METHOD OF ASSEMBLING AN ENHANCED MEDIA CONTENT NARRATIVE", (the "'603 patent"). Namely, the '603 patent dealt with how to assemble or build out the 2D grid matrix for a video program with selectable video clips accessible by a viewer, in which the viewer builds an interactive navigation grid matrix for display. The method and system described in the '603 patent provided a fillable cell via an interface to enable the viewer to insert a title of the video program. The method and system also provided a plurality of fillable cells to enable the viewer to insert chapter and sub-chapter names for media content of the video program and a corresponding number of chapters and a number of sub-chapters, with the chapter and sub-chapter names forming headers of empty cells for a multiple row by multiple column interactive 2D navigation grid matrix displayable to the viewer. Using the interface, the viewer would be able to populate the empty cells of the 2D grid matrix with video clip file names, and then associate a selectable video clip in each sub-chapter with each selectable video clip file name. Thus, each video clip selectable by the viewer represented one of many alternative video program scenes of the video program.

As in the '128 patent, the interactive navigation 2D grid matrix of the '603 patent was formatted so that each row displayed to the viewer was a sub-chapter with selectable video clips common to all columns and each column displayed to the viewer was a chapter having sub-chapters related thereto.

A moving force at the time for the development of the subject matter that became the '128 and '603 patents was to provide a technology to complement the burgeoning DVR market place in the mid-2000s, where early DVR technologies such as TiVo® permitted viewers to move back and forth along a linear collection of scenes. Applicant's 2D grid matrix would provide viewers the ability to move between the scenes, behind the scenes, and beyond the scenes. In essence, this gave both amateur and professional content producers the ability to use all of its content, and delivered richer niche entertainment to audiences.

Today, with the explosion of online video content creation and editing technologies far beyond the now-antiquated DVR technologies, Applicant has found that a much more robust and layered grid matrix may be desired in the marketplace. Particularly, and with ever-expanding avenues for both live and recorded video programs far beyond the DVR segment, Applicant envisions a more robust grid matrix that could interface with any of the numerous streaming services available online, as well as all of the major video sharing and editing sites or apps, including but not limited to YOUTUBE®, VIMEO®, TIKTOK®, FACEBOOK WATCH®, TWITCH®, DAILYMOTION®, INSTAGRAM®, and BYTE®, among others.

As such, there is a need to be able to conduct a multi-dimensional search for video content that may require a notable enhancement over Applicant's original 2D grid matrix architectures.

SUMMARY

An example embodiment of the present invention is directed to a method executed by one or more computing devices for performing a multi-dimensional search of video content accessible by a viewer thereof via an interactive navigation grid matrix to be displayed via a user interface to the viewer. The method includes providing, via the user interface, a plurality of cells adapted to receive the video content so as to build out the interactive navigation grid matrix. This includes providing chapter names of the video content, sub-chapter names associated with each chapter, the chapter and sub-chapter names forming headers of cells and forming two dimensions of the interactive navigation grid matrix, and containers of video content associated for each subchapter name. The containers represent a third dimension of an enhanced three-dimensional interactive navigation grid matrix, with each of the containers accessible within a corresponding subchapter of a given chapter. Nodes of video snippets are associated with each container under a given subchapter name. The method further includes displaying via the user interface the enhanced three-dimensional interactive navigation grid matrix for the viewer, and enabling a viewer to conduct a multi-dimensional search of the video content.

Another example embodiment is directed to a computer system adapted for performing a multi-dimensional search of video content accessible by a viewer thereof via an interactive navigation grid matrix to be displayed via an interface for the viewer. The system includes a processing hardware set, and a computer-readable storage device medium. The processing hardware set is structured, connected and/or programmed to run program instructions stored on the computer-readable storage medium instructions and associated data. The program instructions include an ingestion module programmed to provide, via the user interface, one of automatically populated cells of video content or fillable cells so as to enable the viewer to insert video content therein, and an insertion module programmed to auto-populate, or receive insertions by the viewer, for the video content so as to build out the interactive navigation grid matrix. The grid is to include chapter names of the video content, sub-chapter names associated with each chapter, the chapter and sub-chapter names forming headers of cells and forming two dimensions of the interactive navigation grid matrix, containers of video content associated for each subchapter name, the containers representing a third dimension of an enhanced three-dimensional interactive navigation grid matrix, each of the containers accessible within a corresponding subchapter of a given chapter, and nodes of video snippets associated with each container under a given subchapter name. The system additionally includes a display module programmed, via the user interface, to display the enhanced three-dimensional interactive navigation grid matrix for the viewer, and a processing module programmed to enable a viewer to conduct a multi-dimensional search of the video content.

Another example embodiment is directed to a method for providing the ability to conduct a multi-dimensional search of video content accessible by a viewer thereof via an interactive navigation grid matrix. In the method, a plurality of cells are provided, each cell adapted to receive the video content so as to build out the interactive navigation grid matrix. The grid matrix is to include chapter names of the video content, sub-chapter names associated with each chapter, containers of video content associated for each subchapter name, the containers representing a third dimension of an enhanced three-dimensional interactive navigation grid matrix, and nodes associated with each container under a given subchapter name. The enhanced three-dimensional interactive navigation grid matrix is thus displayed for the viewer. Any of the enhanced three-dimensional interactive navigation grid matrix, a container therein, a node within the container, and any video snippet of the mode or fractional video snippet part of the node thereof is tokenized so as to be designated as a non-functional token (NFT) that is trackable and tradable.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

DETAILED DESCRIPTION

Figure 1:
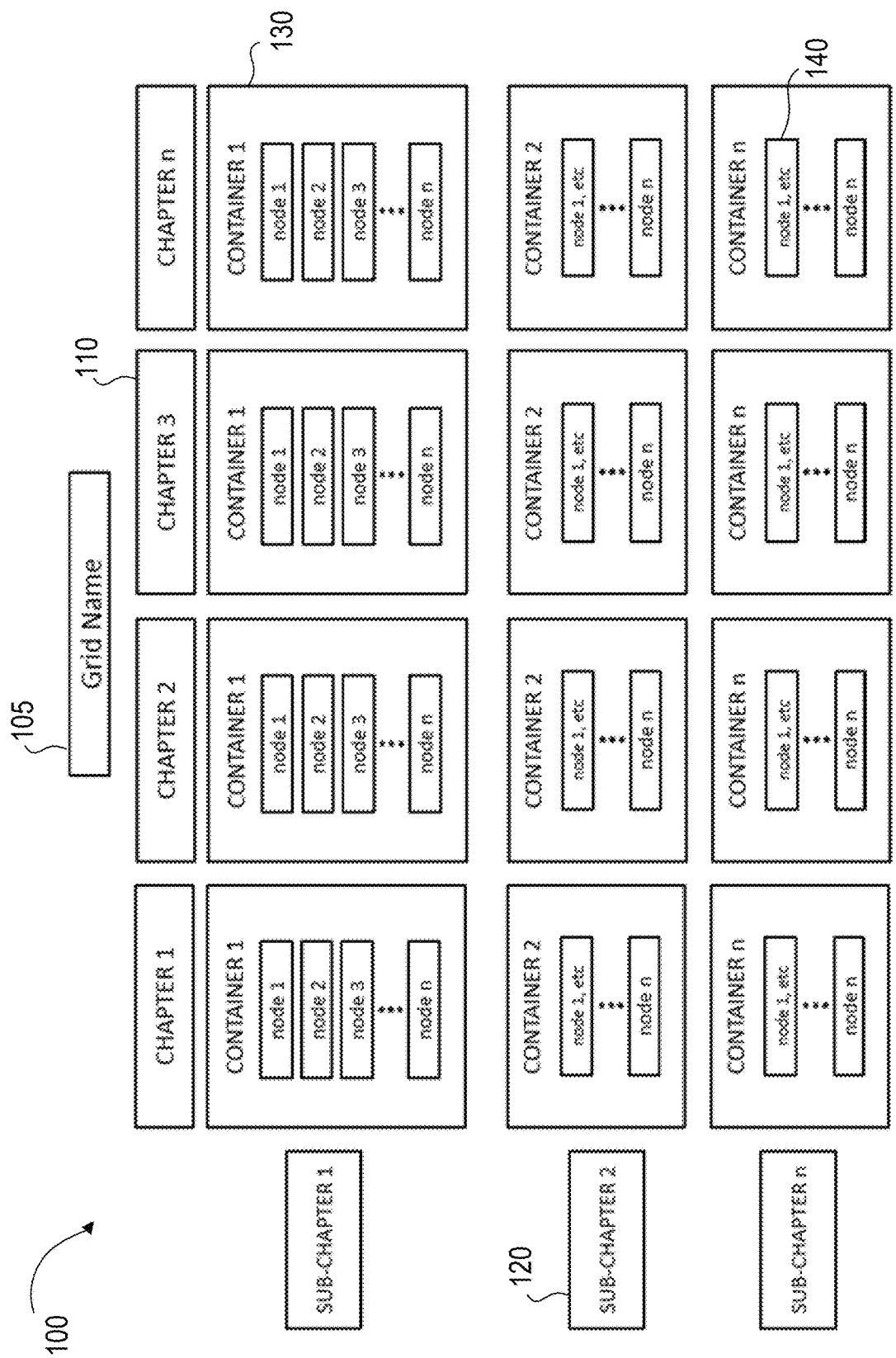
FIG. 1 is a block diagram representation of a three-dimensional interactive navigation grid matrix of video content according to the example embodiments.

In general, the example embodiments hereafter introduce a method and system for performing a multi-dimensional search of video content accessible by a viewer thereof via an interactive navigation grid matrix to be displayed via a user interface of the viewer. This is done by first building out, either via auto-population or by viewer selection via displayed menus and a user interface on their smart device, an interactive three-dimensional grid matrix of video content (hereafter frequently referred to as "grid matrix") which is searchable across all dimensions. Namely, the searchable grid matrix is organized in a conventional two (2)-dimensional nature (column by row) by way of (a) chapter names of the video content, and (b) sub-chapter names associated with each chapter. The third dimension is provided within each subchapter, namely the inclusion of (c) one or more containers (or drawers) of video content associated for each subchapter name. Within each container is included (d) one or a plurality of nodes of video snippets associated with that container within its given subchapter.

The enhanced three-dimensional grid matrix is displayable on the smart device of the viewer via the user interface, thereby allowing the viewer to conduct a multi-dimensional search of video content across all three dimensions of the grid matrix, or via a structured drill-down to search all nodes of a given container. Moreover, viewing the grid and creating content pulled from three dimensions thus offers both amateur and professional content producers the ability to use all of its content so as to develop unique and personal video entertainment.

In the following description, certain specific details are set forth in order to provide a thorough understanding of various example embodiments of the disclosure. However, one skilled in the art will understand that the disclosure may be practiced without these specific details. In other instances, well-known structures associated with manufacturing techniques have not been described in detail to avoid unnecessarily obscuring the descriptions of the example embodiments of the present disclosure.

As used herein, the term video snippet may include any of a singular instance of a video element or frame constituted by a series of video bits (also referred to as a video file), a series of video frames constituting a video highlight, and a full video rendering.

As used herein, the term node is defined as a searchable instance in one of the containers, with the node being composed of one or more instances of video snippets, the metadata corresponding to each of the one or more instances of video snippets that forms the snippet, and a reference to a source for each instance of a video snippet of content. A node can be any scannable entity such as a QR code or a bar code that references a source of the digital content. Hashtags can also be an element of a node or node link between a node source and its node, such as the metadata that goes with a scannable entity such as a QR code. What is captured within the QR code could be hashtags.

As used herein, a container represents a drawer or collection of nodes, with one or more containers assigned to a given sub-chapter in the interactive navigation grid matrix.

As used herein, the terms "program" or "software" are employed in a generic sense to refer to any type of computer code or set of computer-executable instructions that can be employed to program a computer or other processor to implement various aspects of the present invention as discussed above. Additionally, it should be appreciated that one or more computer programs that when executed perform methods of the example embodiments need not reside on a single computer or processor, but may be distributed in a modular fashion amongst a number of different computers or processors to implement various aspects of the example embodiments.

Computer-executable instructions may be in many forms, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Additionally, a "computing device" as used hereafter encompasses any of a smart device, a firewall, a router, and a network such as a LAN/WAN. As used herein, a "smart device" is an electronic device, generally connected to other devices or networks via different wireless protocols such as Bluetooth, NFC, WiFi, ISDN, 3G, 4G, 5G etc., that can operate to some extent interactively and autonomously. Smart devices include but are not limited to smartphones, PCs, laptops, phablets and tablets, smartwatches, smart bands and smart key chains. A smart device can also refer to a ubiquitous computing device that exhibits some properties of ubiquitous computing including—although not necessarily—artificial intelligence. Smart devices can be designed to support a variety of form factors, a range of properties pertaining to ubiquitous computing and to be used in three primary system environments: physical world, human-centered environments, and distributed computing environments.

As used herein, the term "cloud" or phrase "cloud computing" means storing and accessing data and programs over the Internet instead of a computing device's hard drive. The cloud is a metaphor for the Internet.

Further, and as used herein, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, any kind of database object described herein can be implemented as single databases, a distributed database, a collection of distributed databases, a database with redundant online or offline backups or other redundancies, etc., and might include a distributed database or storage network and associated processing intelligence.

The computer system(s), device(s), method(s), computer program product(s) and the like, as described in the following example embodiments, may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means or the like. In general, any device(s) or means capable of implementing the methodology illustrated herein can be used to implement the various aspects of the example embodiments.

Computer program code for carrying out operations for aspects or embodiments of the present invention may be written in any combination of one or more programming languages, including a programming language such as JAVASCRIPT®, JAVA®, SQL™, PHP™, RUBY™, PYTHON®, JSON, HTML5™, OBJECTIVE-C®, SWIFT™, XCODE®, SMALLTALK™, C++ or the like, conventional procedural programming languages, such as the "C" programming language or similar programming languages, any other markup language, any other scripting language, such as VBScript, and many other programming languages as are well known may be used.

The program code may execute entirely on a user's computing device, partly on the user's computing device, as a stand-alone software package, partly on the user's computing device and partly on a remote computer or entirely on the remote computer or server. In the latter scenario, the remote computer may be connected to the user's computing device through any type of network, including a LAN or WAN, or the connection may be made to an external computer (for example, through the Internet using an Internet Service Provider).

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one example embodiment" or "an embodiment" means that a particular feature, structure or characteristic described in connection with the embodiment is included in at least one embodiment. Thus, the appearances of the phrases "in one example embodiment" or "in an embodiment" in various places throughout this specification are not necessarily all referring to the same embodiment. Further, the particular features, structures or characteristics may be combined in any suitable manner in one or more example embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

As used in the specification and appended claims, the terms "correspond," "corresponds," and "corresponding" are intended to describe a ratio of or a similarity between referenced objects. The use of "correspond" or one of its forms should not be construed to mean the exact shape or size. In the drawings, identical reference numbers identify similar elements or acts. The size and relative positions of elements in the drawings are not necessarily drawn to scale.

Figure 2:
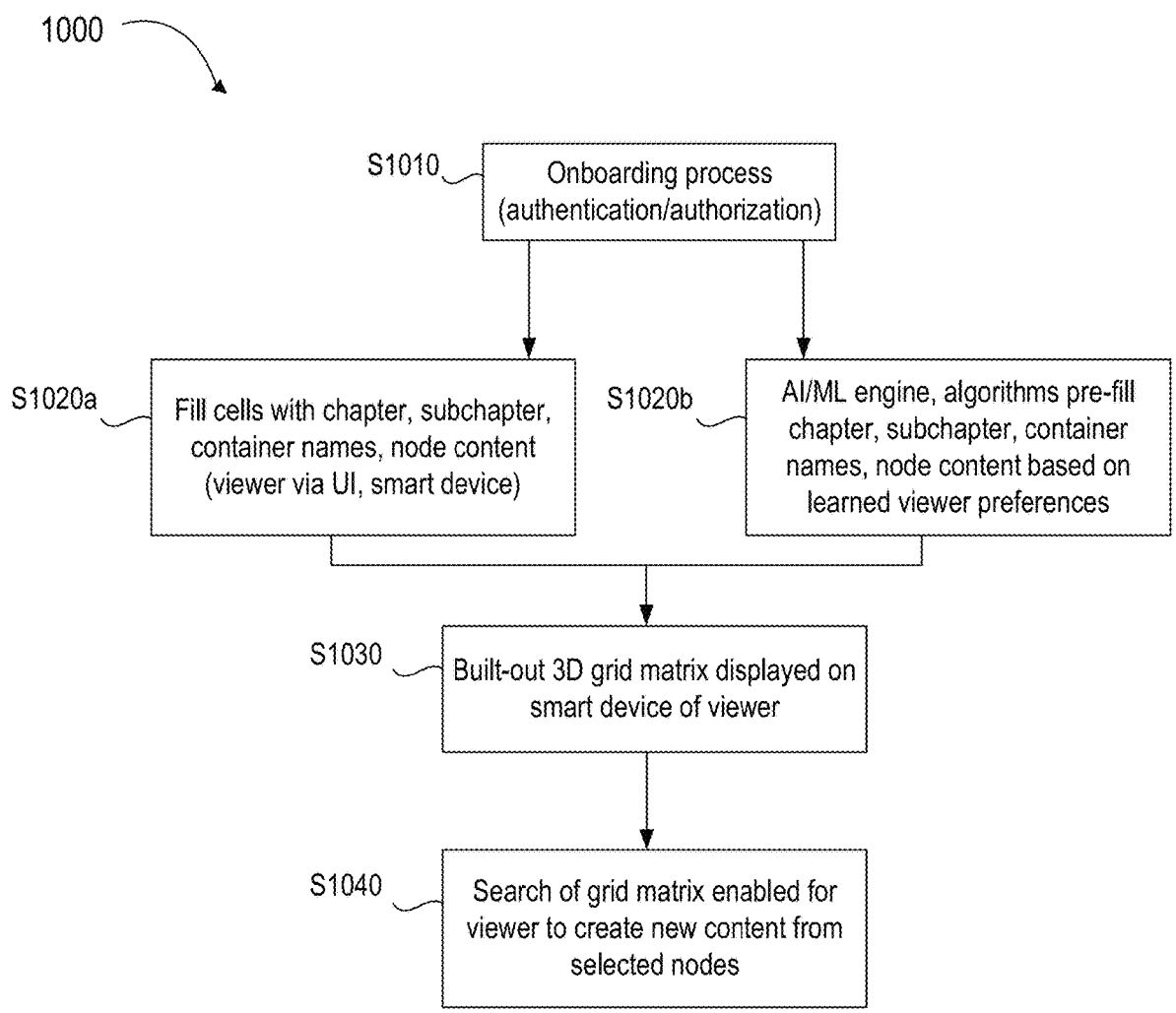
FIG. 2 is a flow diagram to describe a method of performing a multi-dimensional search of video content accessible by a viewer thereof for the interactive navigation grid matrix of FIG. 1.

FIG. 1 is a block diagram representation of a three-dimensional interactive navigation grid matrix of video content according to the example embodiments; FIG. 2 a flow diagram to describe a method for performing a multi-dimensional search of video content accessible by a viewer thereof for the interactive navigation grid matrix of FIG. 1, and FIG. 3 shows a system for performing the multi-dimensional search method of FIG. 2.

Figure 3:
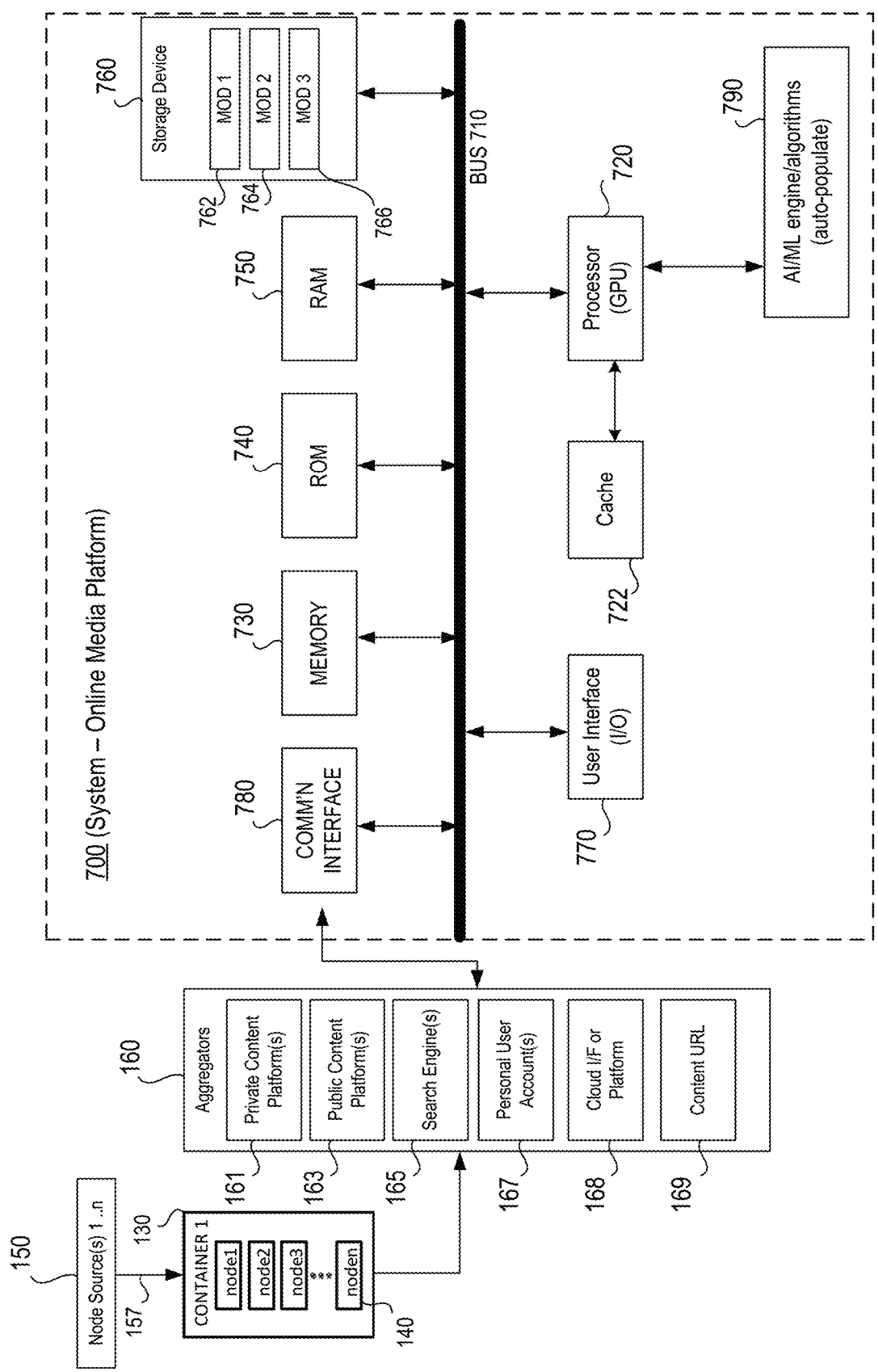
FIG. 3 is a block diagram to describe a system adapted to execute the multi-dimensional search method of FIG. 2.

Referring now to FIG. 2, with occasional reference to FIGS. 1 and 3, there is shown a method 1000 according to the example embodiments, namely a method, which is executed by one or more computing devices of system 700 in conjunction with user interface 770 (which could be accessed via a smart device of a viewer) in order to perform a multi-dimensional search of video content accessible by a viewer thereof via an interactive navigation grid matrix 100. The grid matrix 100 is displayed via the user interface to the viewer (such as on his or her smart device).

Initially, a credentialling operation or onboarding process (S1010) needs to occur for the viewer to have access to the online media platform (embodied by system 700) for building out and searching the grid matrix. This includes well known authentication and licensing approvals (for copyrighted content) and as such is not described in detail herein.

Via the user interface 770 on the viewer's smart device, the viewer may be prompted (with menu load and edit commands, etc.) to fill empty cells of the grid matrix 100 (S1020a) with the various names (chapter 110, sub-chapter 120), and acquire node 140 content (from node sources 150) via aggregators 160 to build out containers 130. The node source 150 video content accumulated by a given aggregator 160 is accessed by system 700 over a communication interface 780 (digital connections). Aggregators 160 of content include but are not limited to private content platforms 161, public content platforms 163 (YouTube), search engines 165 (GOOGLE, BING, etc.), Personal User Accounts 167 (such as those of system 700), by a cloud interface or platform 168 such as hyperscalers AWS and AZURE by Microsoft, and direct content URLs 169.

Recall that node 140 can be represented by any scannable entity such as a QR code or a bar code that references a source of the digital content. Hashtags can also be an element of a node or node link 157, such as the metadata that goes with a scannable entity such as a QR code. What is captured within the QR code could be hashtags.

In particular, via a user interface (UI), the viewer may insert the following: (a) chapter 110 names of the video content, (b) sub-chapter 120 names associated with each chapter, (c) containers 130 of video content associated for each subchapter 120 name, and (d) nodes 140 of video snippets associated with each container 130 under a given subchapter 120 name. As shown in FIG. 1, the chapter 110 and sub-chapter 120 names form headers of empty cells (to be filled) for 2 dimensions of the interactive navigation grid matrix 100 (multiple row by multiple column).

Alternatively, an AI/ML engine 790 iterating algorithms and in communication with system processor 720 (such as a GPU), may pre-fill the cells (S1020b) to build out the grid matrix 100. This could be done based on past or learned viewer preferences. In operation in one example, AI/ML engine 790 could be an API that provides pre-trained machine learning models that automatically recognize a vast number of objects, places, and actions in both stored and streaming video, so as to auto-populate the grid matrix 100 for the viewer.

Once the grid matrix 100 is populated/filled with video content, it may be displayed on the viewer's smart device (S1030), via the user interface 770, as an enhanced three-dimensional (3D) interactive navigation grid matrix. Namely, each container 130 represents the third dimension of the grid matrix 100 accessible within each subchapter 120 of a given chapter 110. Additionally, each node 140 represents one or more instances of video snippets accessible within its corresponding container 130 of a given subchapter 120.

Within the displayed grid matrix 100, the user is thus able to conduct a multi-dimensional search (S1040) of video content across all three dimensions of the grid matrix 100. In another example, the viewer can perform a structured drill-down to search all nodes 140 of a given container 130. Each node 140 is composed of one or more instances of video snippets, the metadata corresponding to each of the one or more instances of video snippets, and a reference to a source of each instance of a video snippet of content.

In a commercial manifestation, a commercial platform based on the example computer system(s) 700 and computer-implemented method 1000 described above and more hereafter includes technology and digital offerings (e.g. website, mobile application, non-transitory, computer-readable information storage media, tools, etc.). In one example, the commercial platform includes a downloadable mobile app. The mobile app (which may be subscription-based) is designed to provide subscribers with access to searchable video content via a grid matrix structure.

In one example, the commercial platform based on the example computer system 700 and computer-implemented method 1000 may be directed to multiple sales channels, including but not limited to: (a) B2C direct via the mobile app downloaded from a digital distribution service such as the GOOGLE PLAY™, AMAZON® Appstore and/or App Store by APPLE®; (b) a B2B relationship whereby applications may be licensed and offered under a designated brand; and (c) a B2B relationship whereby the licensing entity rebrands the applications for integration into their product suite.

Referring now to FIG. 3, system 700 (which may be representative of one configuration for an online media platform) is shown for example purposes as a basic general-purpose computer system (or computing device) to practice the concepts, method 1000, and techniques disclosed. System 700 includes a processing unit (GPU, CPU or processor) 720 and a system bus 710 that couples various system components including the system memory 730 such as read only memory (ROM) 740 and random access memory (RAM) 750 to the processor 720. System 700 can include a cache 722 of high-speed memory connected directly with, in close proximity to, or integrated as part of the processor 720.

The system 700 copies data from the memory 730 and/or the storage device 760 to the cache 722 for quick access by the processor 720. In this way, the cache 722 provides a performance boost that avoids processor 720 delays while waiting for data. These and other modules can control or be configured to control the processor 720 to perform various operations or actions.

Other system memory 730 may be available for use as well. The memory 730 can include multiple different types of memory with different performance characteristics. It can be appreciated that method 1000 may be iterated on a computing device or system 700 with more than one processor 720 or on a group or cluster of computing devices networked together to provide greater processing capability.

The processor 720 can include any general-purpose processor and a hardware module or software module, such as module 1 762 (which may be an ingestion software module which is programmed to provide, via the user interface 770, one of automatically populated cells of video content or fillable cells (performing part of S1020a/b) so as to enable the viewer to insert video content therein. Module 2 764 may be embodied as an insertion module programmed to autopopulate, or receive insertions by the viewer, for the video content so as to build out the interactive navigation grid matrix by chapter, subchapter, container, node (performing part of S1020a/b). Module 3 766 may be embodied as a display module programmed, via the user interface 770, to display an enhanced three-dimensional interactive navigation grid matrix 100 to the viewer. Each of module 1 762, module 2 764, and module 3 766 may be stored in a storage device 760, and configured to control the processor 720 as well as a special-purpose processor where software instructions are incorporated into the processor.

The processor 720 may be a self-contained computing system, containing multiple cores or processors, a bus, memory controller, cache, etc. A multi-core processor may be symmetric or asymmetric. The processor 720 can include multiple processors, such as a system having multiple, physically separate processors in different sockets, or a system having multiple processor cores on a single physical chip.

Similarly, the processor 720 can include multiple distributed processors located in multiple separate computing devices, but working together such as via a communications network. Multiple processors or processor cores can share resources, such as memory 730 or the cache 722, or can operate using independent resources. The processor 720 can include one or more of a state machine, an application specific integrated circuit (ASIC), or a programmable gate array (PGA) including a field PGA.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up.

The computing device 700 further includes storage devices 760 or computer-readable storage media such as a hard disk drive, a magnetic disk drive, an optical disk drive, tape drive, solid-state drive, RAM drive, removable storage devices, redundant array of inexpensive disks (RAID), hybrid storage device, or the like. The storage device 760 can include software modules 762, 764, 766 for controlling the processor 720.

The system 700 can include other hardware or software modules. The storage device 760 is connected to the system bus 710 by a drive interface. The drives and associated computer-readable storage devices provide nonvolatile storage of computer-readable instructions, data structures, program modules and other data for the computing device 700. In one aspect, a hardware module that performs a particular function includes the software component stored in a tangible computer-readable storage device in connection with the necessary hardware components, such as the processor 720, bus 710, display 770, and so forth, to carry out a particular function. In another aspect, the system can use a processor and computer-readable storage device to store instructions which, when executed by the processor, cause the processor to perform operations, a method or other specific actions.

The basic components and appropriate variations can be modified depending on the type of device, such as whether the device 700 is a small, handheld computing device, a desktop computer, or a computer server. When the processor 720 executes instructions to perform "operations", the processor 720 can perform the operations directly and/or facilitate, direct, or cooperate with another device or component to perform the operations.

Although the exemplary computer system 700 employs a hard disk 760, other types of computer-readable storage devices which can store data that are accessible by a computer, such as magnetic cassettes, flash memory cards, digital versatile disks (DVDs), cartridges, random access memories (RAMs) 750, read only memory (ROM) 740, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, user interface 770 represents any number of input and output (I/O) mechanisms. For example, a smart electronic device (smartphone, tablet, PDA and the like) can be accessed for input using a touch screen or pointing device (e.g., a mouse). Output via the user interface 770 can be triggered by a user's finger or with a cursor of a mouse/touch screen, or with the viewer's eyes when the user interface 770 includes an eye tracker. Alternatively, functions or outputs of the system 700 graphically shown on a display of the viewer's smart device can be triggered based on a user's facial or physical expression where the user interface 770 includes or can access (on the viewer's smart device) a camera with appropriate gesture tracking technology, with voice where the user interface 770 includes or can access (on the viewer's smart device) a microphone with appropriate voice recognition technology, or by thoughts where the smart device includes a brain-computer interface to which access is possible via the user interface 770.

Figure 4:
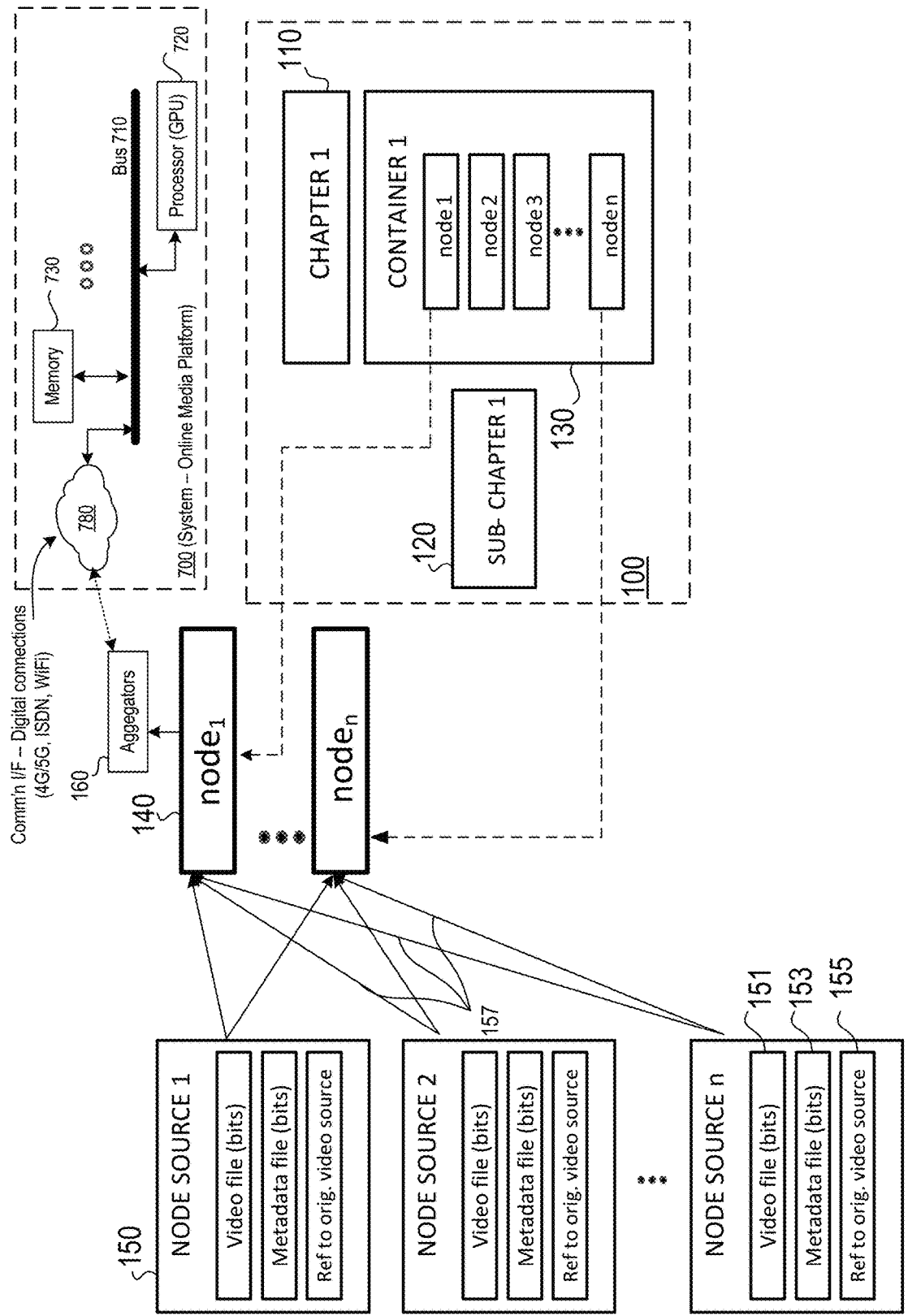
FIG. 4 is block diagram to describe how video content from node sources is aggregated for digital transmission via a communication interface to the online media platform embodied by the system of FIG. 3.
Figure 5:
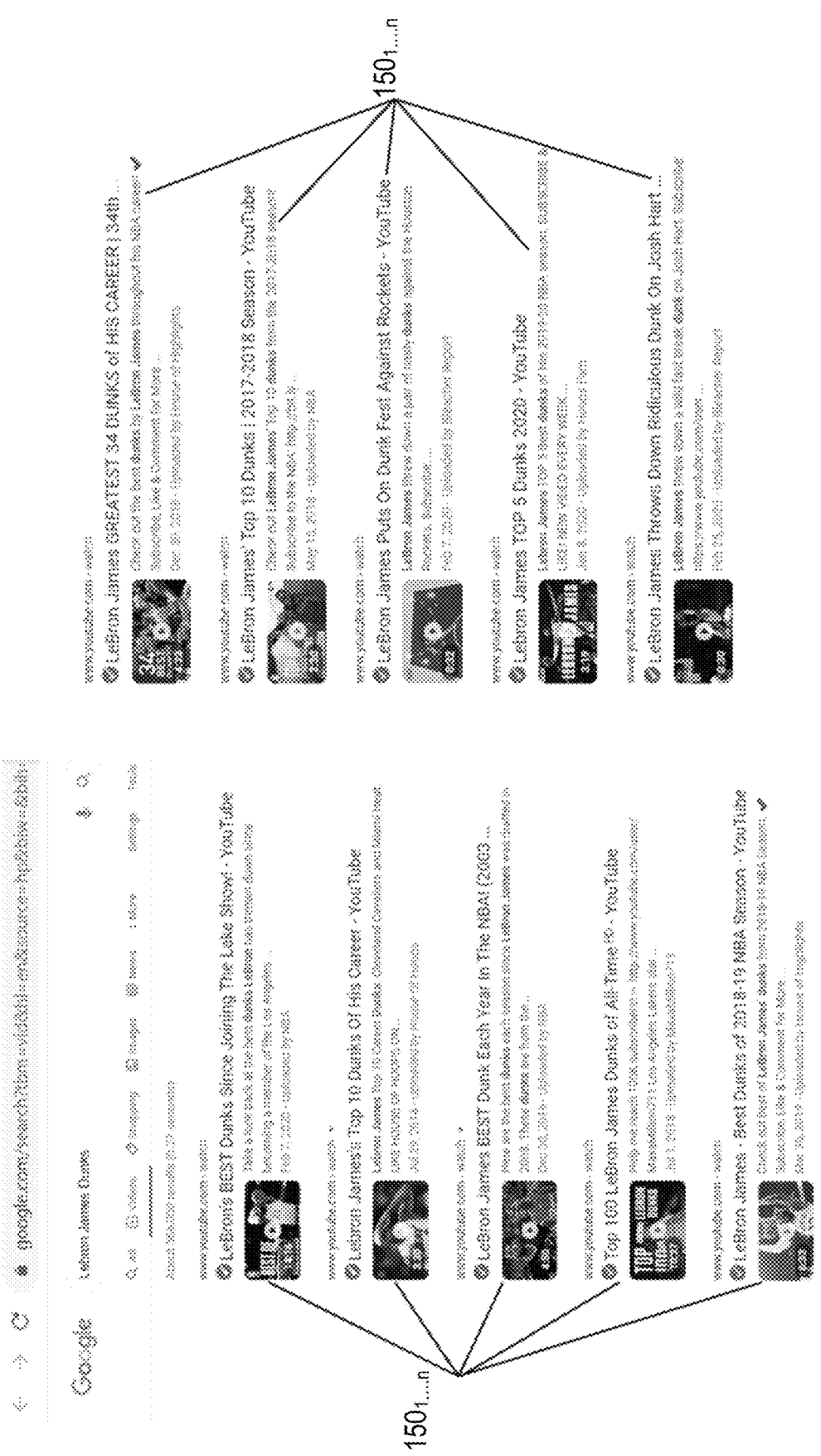
FIG. 5 is a screenshot of an aggregator's collection of node sources, where the aggregator is embodied as a search engine.
Figure 6:
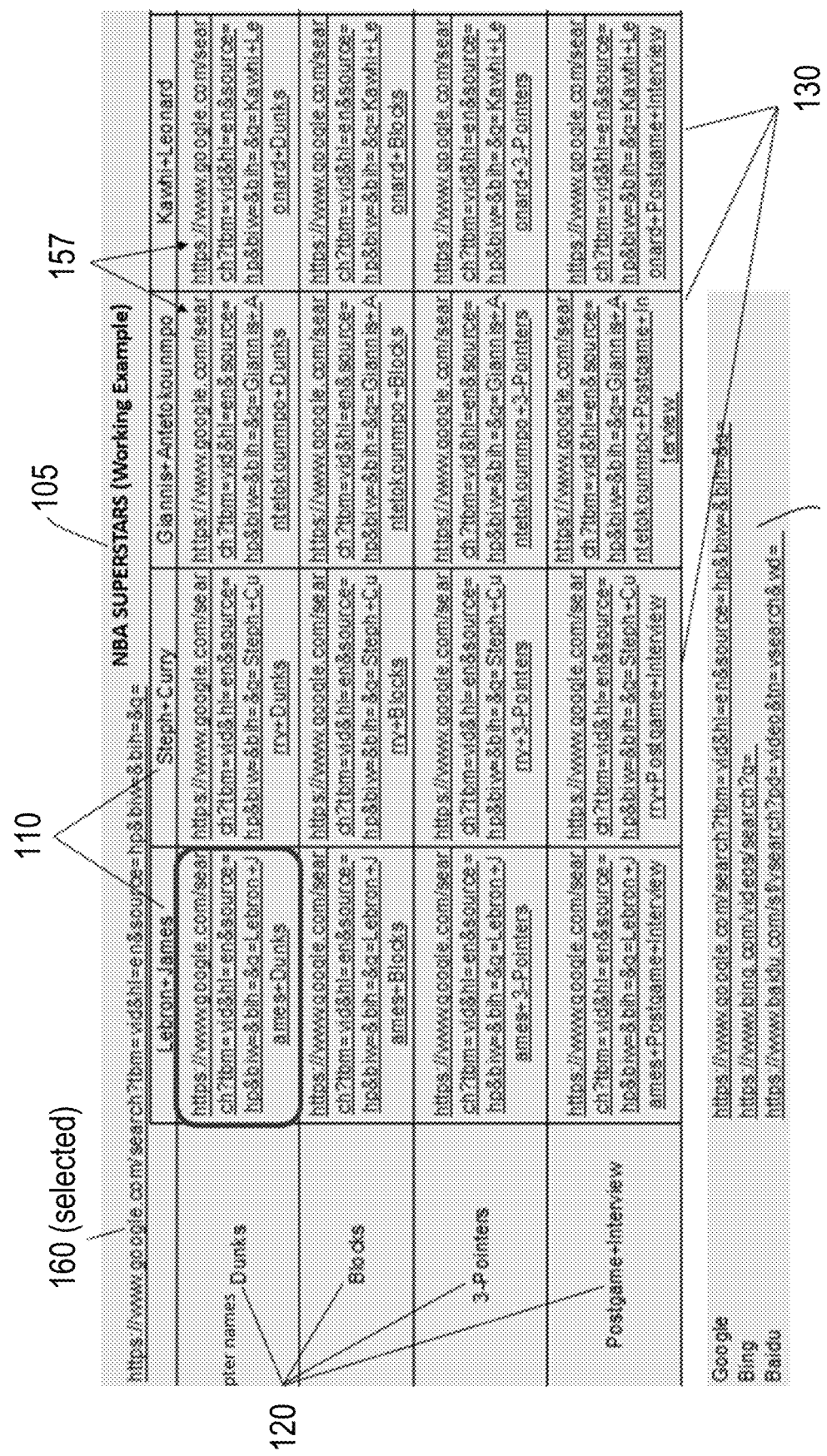
FIG. 6 is a screenshot of an excel file which shows a functional representation of the grid matrix of FIG. 1 in terms of its constituent components.

FIG. 4 is block diagram to describe how video content from node sources 150 is aggregated for digital transmission via the communication interface 780 to the online media platform embodied by the system 700 shown in FIG. 3. FIG. 5 is a screenshot of an aggregator 160's collection of node sources 150, where the aggregator 160 shown in the screenshot is embodied as a search engine. FIG. 6 is a screenshot of an excel file which shows the functional representation of the grid matrix of FIG. 1 in terms of its constituent components. FIGS. 4 to 6 illustrate functionally, with greater detail, how video content for nodes 140 of a container 130 is accessed from a vast plurality of node sources 150 accumulated at an aggregator 160.

Referring to FIG. 4, the left side shows an expanded breakout for node 1 and node n from the interactive navigation grid matrix 100. The video content from each node source 150 is accumulated by a given aggregator 160 (see FIG. 6), as previously discussed. A given aggregator 160 could be embodied as a search engine as shown in FIG. 6, or by a plurality of node feeds, for example) This video content from these aggregators 160 is then accessed by system 700 over a communication interface 780 (digital connections).

Recall that node 140 can be represented by any scannable entity such as a QR code or a bar code that references a source of the digital content. One or more hashtags can also be an element of a node 140 or node link 157, such as the metadata that goes with a scannable entity such as a QR code. What is thus captured within any QR code could be one or more hashtags.

Figure 7:
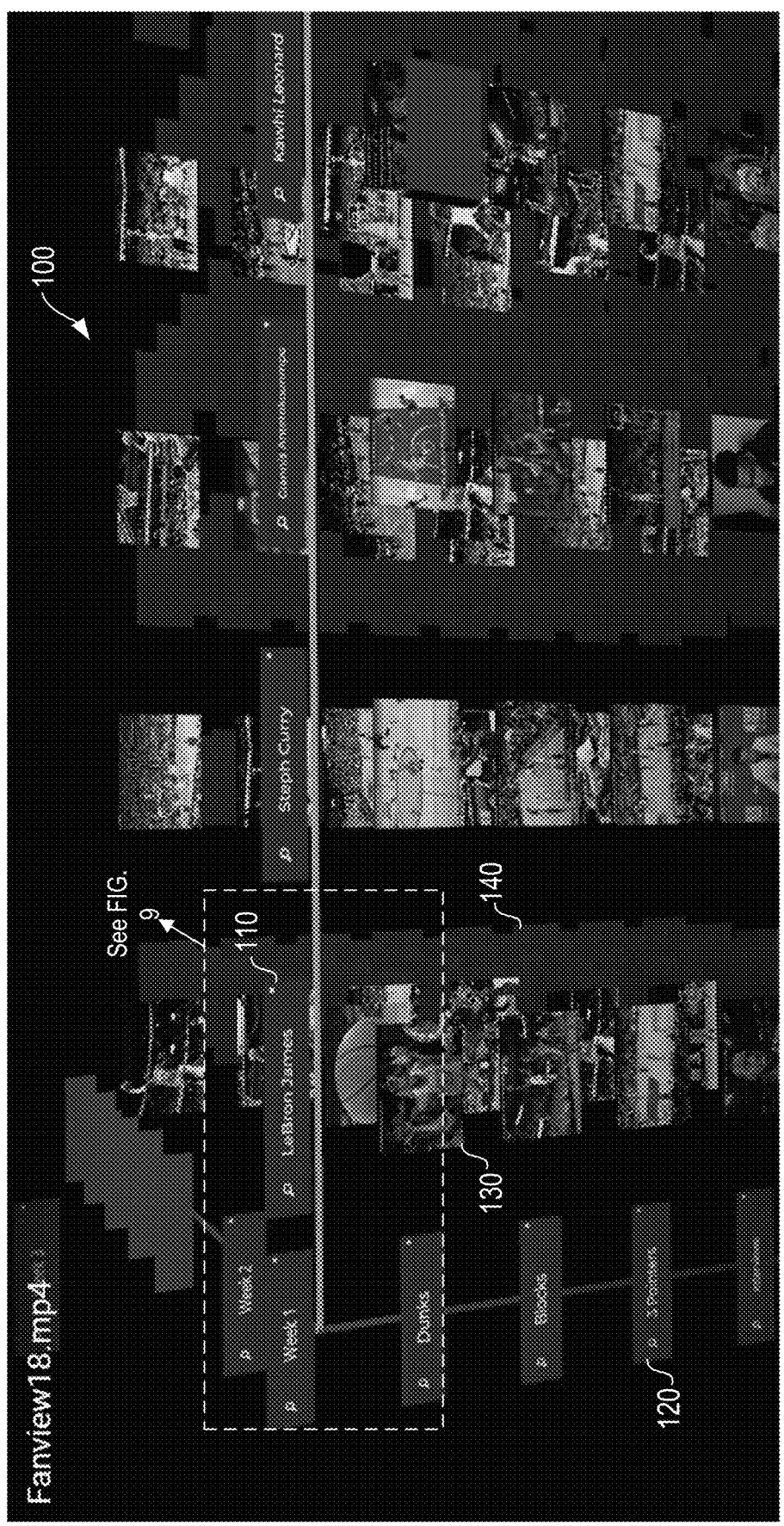
FIG. 7 is a screenshot of a video to illustrate the 3-dimensional nature of the interactive grid matrix of FIG. 1 in a working example of NBA stars.
Figure 8:
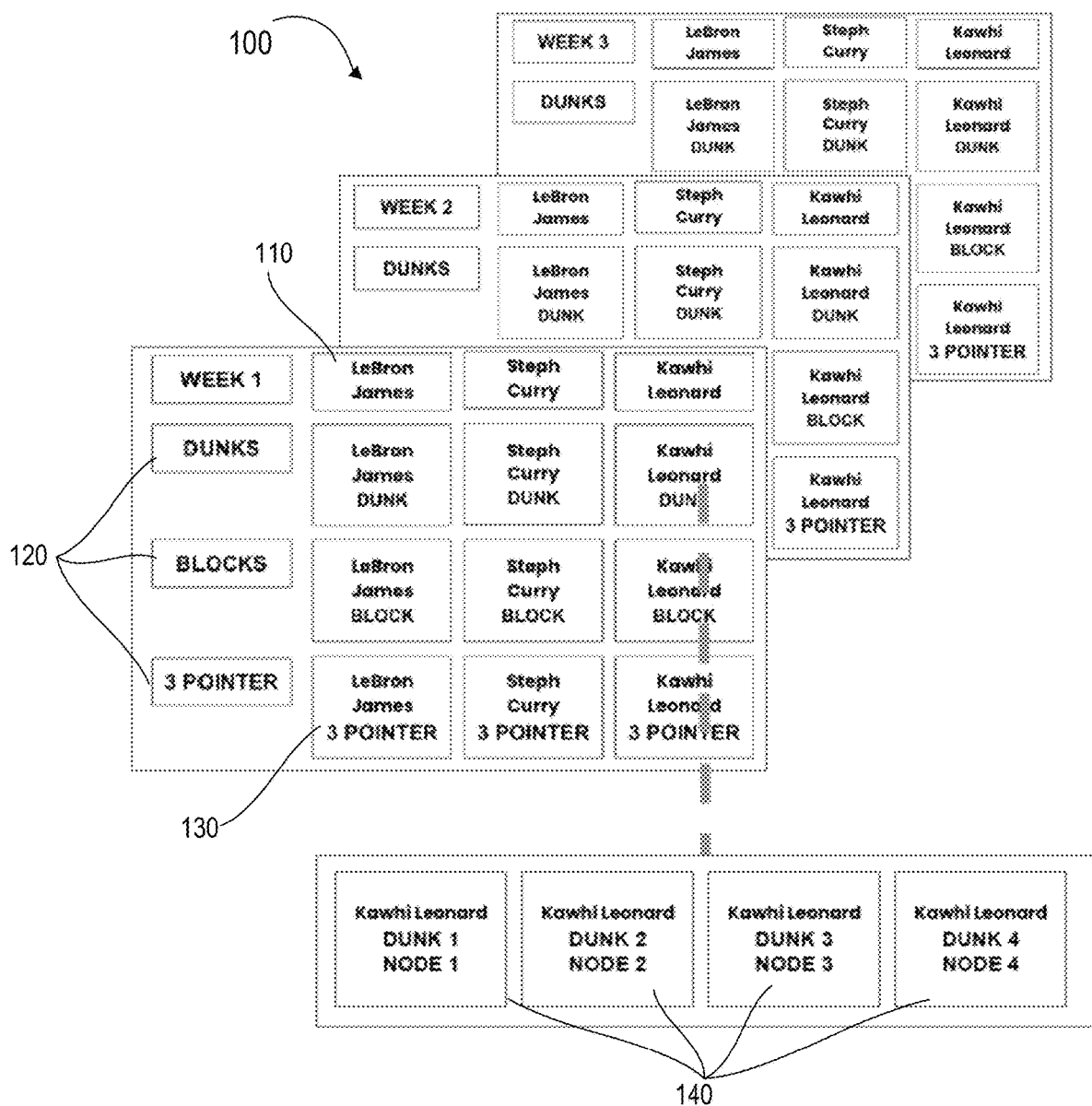
FIG. 8 is a wireframe block diagram representation of the three-dimensional interactive navigation grid matrix of video content shown in the screenshot of FIG. 7.
Figure 9:
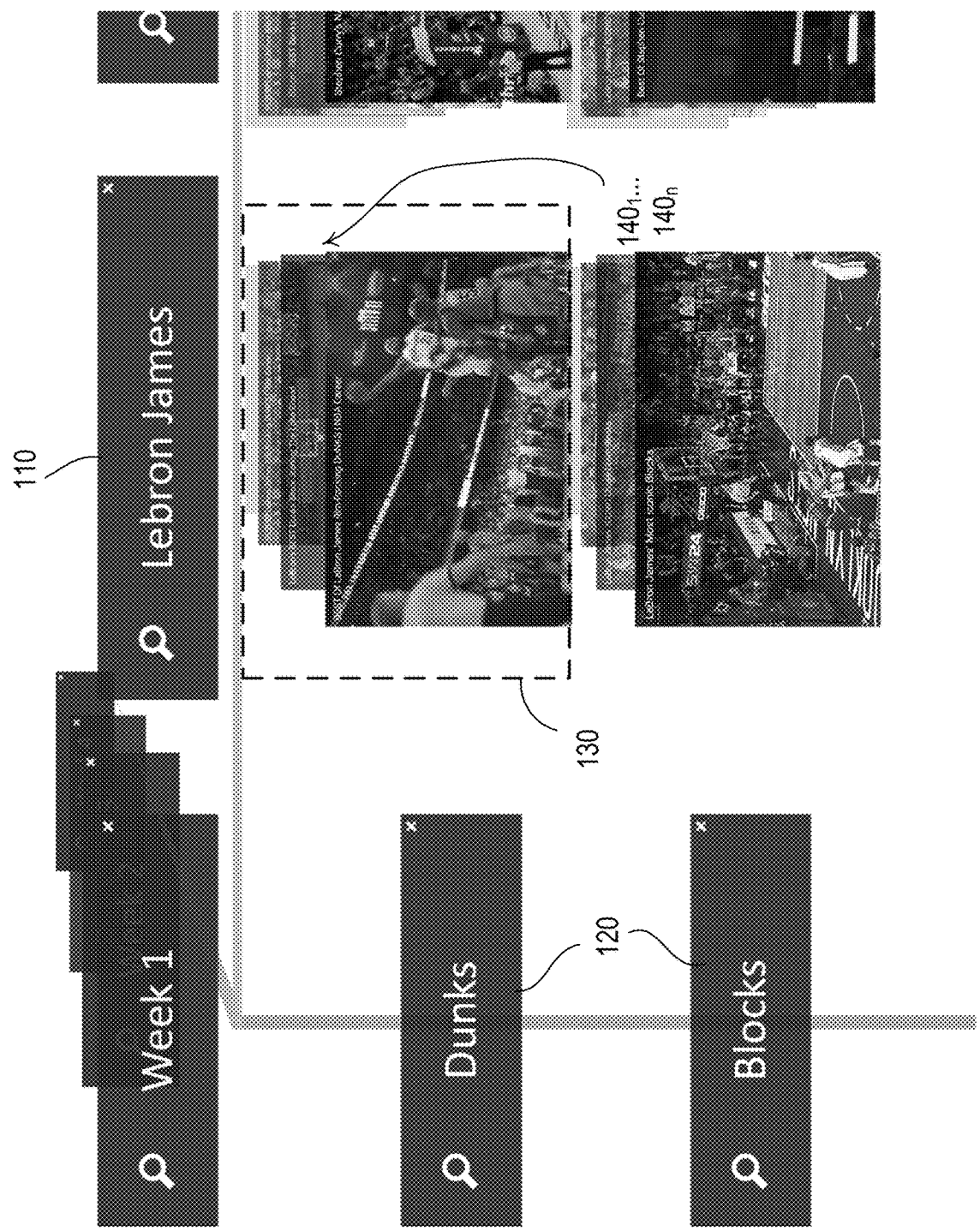
FIG. 9 is another expanded portioned screenshot from the video of FIG. 7 to illustrate selection of a particular node (video snippets of LeBron James' dunks) from a container in the chapter labeled "LeBron James", sub-chapter "Dunks".
Figure 10:
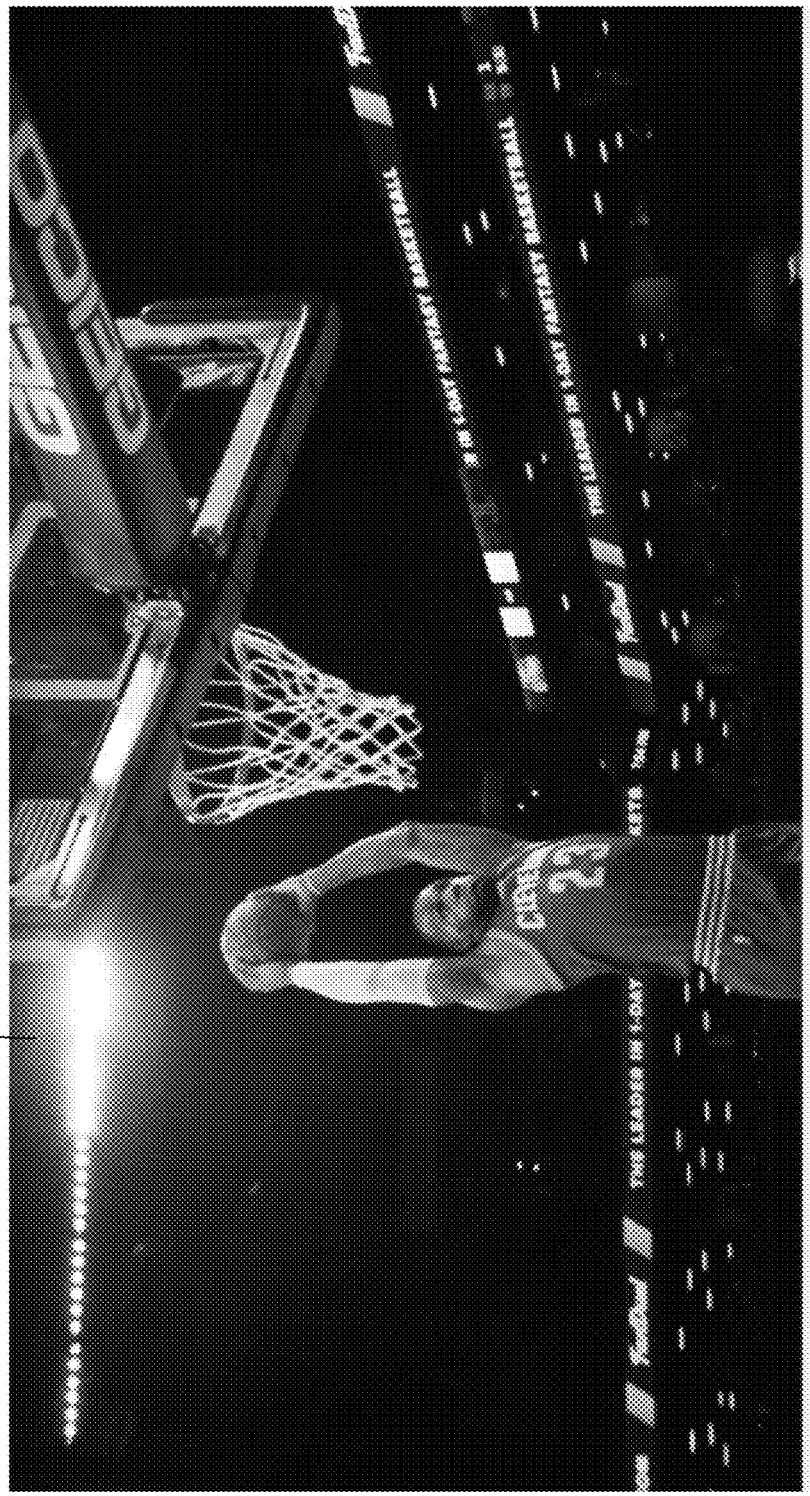
FIG. 10 shows a selected video snippet from the selected node of FIG. 9, a video instance of a compendium of dunks from the node source.

FIGS. 7 to 10 provide a working example of the method and system as rendered in an instructional video by Applicant. In FIG. 7 the screenshot of a video shows the 3-dimensional nature of the interactive grid matrix of FIG. 1. This particular screenshot shows a grid matrix of a series of NBA stars, with the chapter, subchapter, container and node configuration previously described above. FIG. 8 shows the wireframe block diagram that is shown by the screenshot of FIG. 7. Additionally, FIG. 9 is another expanded portioned screenshot from the video of FIG. 7 to illustrate selection of a particular node 140 (video snippets of LeBron James' dunks) from a container 130 in the chapter 110 labeled "LeBron James", sub-chapter 120 labeled as "Dunks". FIG. 10 shows a selected video snippet from the selected node 140 from FIG. 9, namely a video instance that is a compendium of dunks from the node source.

Figure 11:
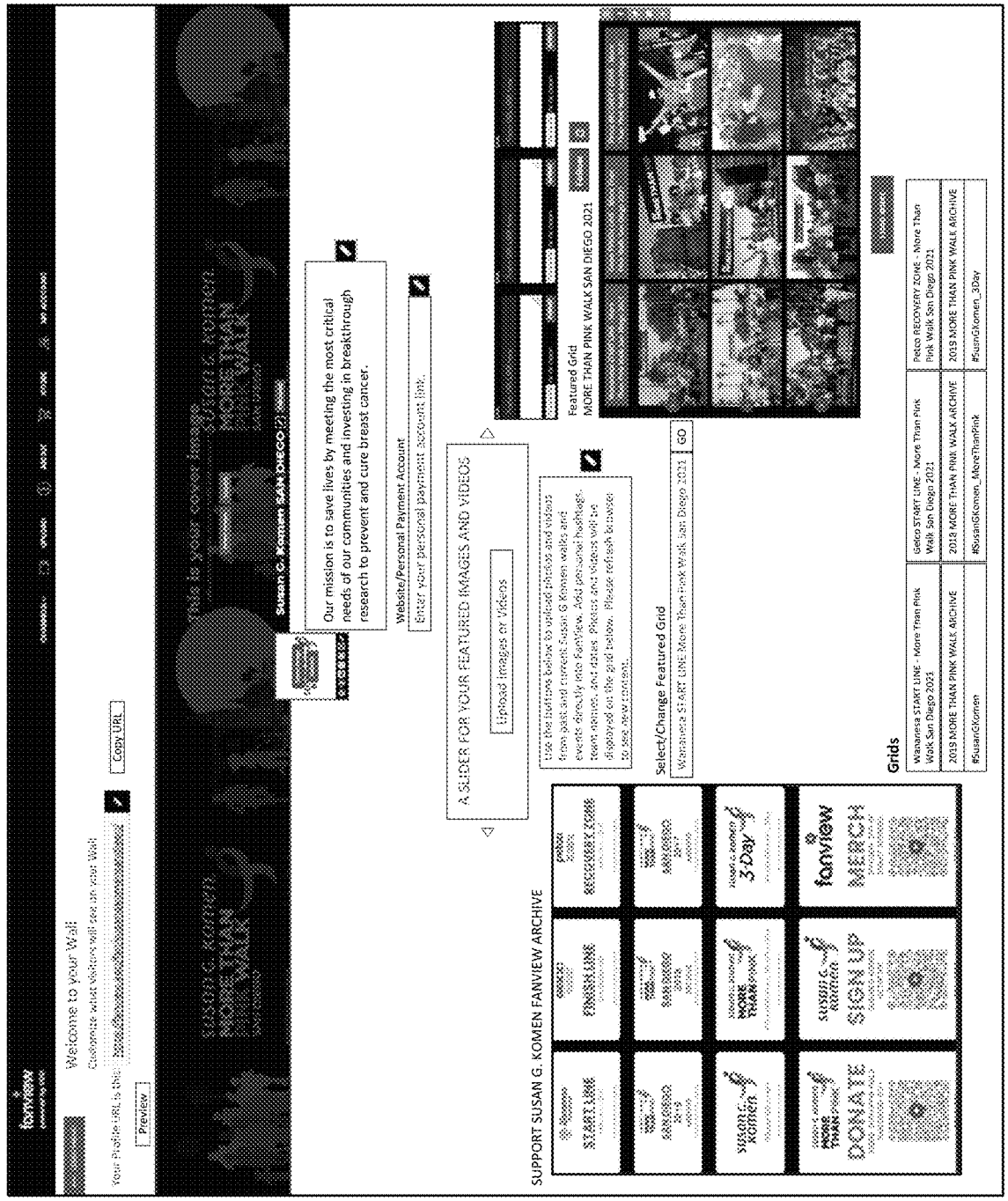
FIG. 11 is a screenshot of an admin page used by an admin user to create a public-facing event page for public viewing according to an actual commercial application.
Figure 12:
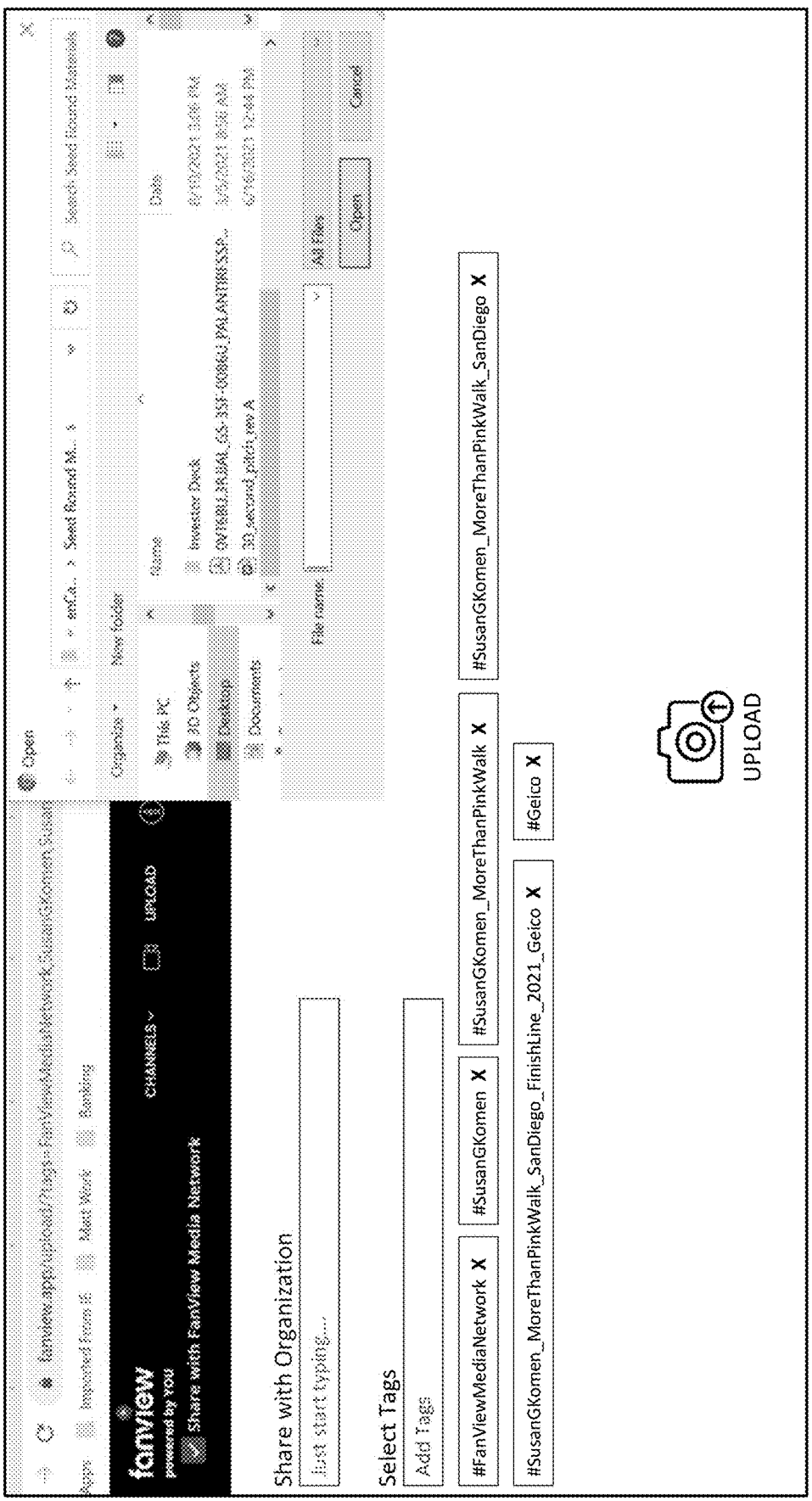
FIG. 12 is a screenshot of an upload page that when selected permits content to be uploaded.
Figure 13:
FIG. 13 is the public facing event page created by the admin user for the event.

FIG. 11 shows an admin page used by an admin user to create their event page 200 for the public; FIG. 12 is a screenshot of an upload page 270 that when selected permits content to be uploaded; and FIG. 13 is the public facing event page 200A created by the admin user for the event. Each of FIGS. 11-13 is based on an actual commercial application built in accordance with the exemplary method and system.

Referring to FIG. 11, there are two parts of an event; one is the admin event The admin webpage 200 is thus like a bulletin board that allows the admin user to upload photos, videos, links, data or grids right into the public wall. Notice at the top of the admin webpage 200 there is the text that says "Welcome to Your Event Wall" and it gives you a profile URL. This is the URL that is shared with anybody who wants to look at this page and that URL can also be also programmed into merchandise. The URL is a customizable—in this instance it says Fanview.app/fan. That indicates the type of account that it is, a fan account. There may also be athlete accounts, coaches/team accounts, etc., in addition to the event sponsor account Susan G. Komen, and it's a customizable feature for or paid subscribers.

See further at the upper left hand location a user guide button 205 that the admin user can refer to as needed, along with a link in cell 207 that provides the link to the public for accessing the public facing webpage 200A to be described hereafter. A preview button 209 and a copy URL button 211 may be provided, as well as an edit hypertext cell 213 to change the URL.

An event page banner 215 may be displayed, which includes icons to select an image (button 217) and submit it (upload, see button 219). These function buttons optionally may be overlayed on the event logo 221. The banner 215 shown on the event page 200 is where you can select a banner, add your avatar or icon image, and then insert basically your square shot. An active row of icons 222 is also provided beneath the logo that allows the user to put all their social media links so that Instagram, Facebook, URL, Snapchat, Twitter are accessible. So the idea there is that the application shown by this screenshot is a place where one can see, collect, and aggregate all of your social media.

Note the QR code on the social media active icon 222, at the end of the row. The admin user can select this and see how this screen opens and it says "Fanview Susan G. Komen" and it generates a QR code. The QR code in this example is solely designed to bring users to the application, but the application also allows for users to create customized QR codes. In an example for an upload link, when people want to upload their content, they can just capture it in an upload link and the application will include hashtags in there. The application thus will have a QR code generator for not just the event webpage 200 but also for upload QR codes as well.

There is a cell 223 for mission/vision statement entry and its editor button 225, as well as a cell 227 with edit button 229 to enter payment account data or a link thereto. Thus, the admin user can add text (such as vision or mission statement), and also website or personal information (shown payment info).

The webpage 200 provides a scrolling editor screen 231 ("slider wall") with action button 233 to enable the admin user to upload desired images and videos. Just below an instruction cell 235 is provided, as well as a select/change cell 237 to change out the featured grid 240, which can be a drop down menu with selectable choice.

For editing and uploading content, the admin event page 200 has a series of buttons for different grids 100—that is just how the public would see it on the public facing page 200A, but would have no ability to edit. The slider wall 231 brings the digital content that the admin user has published and uploaded into a gallery zone for selection. There is actually a buffer in the gallery zone so the admin user can select which content (pictures, video snippets, etc.) they want to post in the selected or featured grid 240.

Also shown at lower right are three "paste URL link here" cells 241 with choose file 243 and select 245 action buttons. Particularly, cells 241 offer alternate upload cells to upload a link to content of a specific file in a given grid 100 of choice. The featured grid 240 shown is a 3×3 multi-dimensional grid, although it has been truncated for brevity; see the load more button 247 there below to load and display additional rows of the featured grid 240. To the left lower side of webpage 200 is shown an archive grid 250 of selectable buttons. Any button selection automatically uploads a given grid 100 corresponding thereto. The bottom row show three merch buttons 251 that when selected direct the user to a merchandise page. At the bottom and centrally located on webpage 200 is shown a plurality of other selectable grids 260; this serves as an alternate hypertext link to desired given grids 100 of choice.

The event webpage 200 thus has a series of buttons in featured grid 240. Above the buttons are the aforesaid cells 241 with link; here is where an admin user would add the link that they want to go to. In an example, the admin user can add the upload URL with its hashtags in there, and a description right in here. The buttons in grid 240 and archive grid 250 allow the user to choose a particular grid to upload photos and videos from past and current Susan G. Komen walks and events directly into the application.

As noted multiple times prior, a node 140 can be any scannable entity such as a QR code or a bar code that references a source of the digital content. Hashtags can also be an element of a node 140 or node link 157, such as the metadata that goes with a scannable entity such as a QR code. What is captured within the QR code could be hashtags. In FIG. 11, the admin user is logged into this Susan G. Komen account.

FIG. 12 shows an example popup page (upload page 270 with folder popup 275) that is displayed selecting one of the buttons in a featured grid 240 or archived grid 250; note the hashtags 272 below the entry cells 273 for Organization and 274 for Tags. As an example, as each button from grids 240/250 is connected to an upload link, if the user clicks on the starting line button, it will bring you right into the FIG. 12 upload page 270 with hashtags 272, along with folder pop-up 275.

FIG. 13 shows the public facing event webpage 200A, very similar to the admin user page 200. Note also for both webpages 200/200A, the featured grid 240 can be changed by user selection. If the user clicks on one of the containers 130 in a subchapter row 120 of a grid 100, it will lead the user to the nodes 140, which may be pictures, video snippets, additional links and the like.

The example method and system as embodied by the exemplary 3D grid is innately applicable to the non-fungible token (NFT) marketplace with regard to the created digital content of users, as shown in the grids, containers of the grids, nodes of a container, etc., in order to create collections of NFTs or even a "super NFT" with multiple views that are exchanged via a blockchain.

Non-fungible tokens (NFTs) can be understood by understanding the definition of both a non-fungible asset and a token. A non-fungible asset is something unique that isn't readily interchangeable; e.g., a rare sports card, an antique car, or a piece of land. This differs from a fungible asset like cash. A token is a type of virtual currency that lives on a blockchain and represents a specific asset, like a piece of digital artwork. Thus, in general a NFT is a documentation of ownership of a one-of-a-kind digital asset.

NFTs are different from ERC-20 tokens, such as DAI or LINK, in that each individual token is completely unique and is not divisible. NFTs give the ability to assign or claim ownership of any unique piece of digital data, trackable by using Ethereum's blockchain as a public ledger. An NFT is minted from digital objects as a representation of digital or non-digital assets. For example, an NFT could represent any of digital art, GIGs, collectibles, music, photos and videos, real world items such as deeds to a car, tickets to a real-world event, tokenized invoices, legal documents, and signatures.

An NFT can only have one owner at a time. Ownership is managed through the uniqueID and metadata that no other token can replicate. NFTs are minted through smart contracts that assign ownership and manage the transferability of the NFT's. When someone creates or mints an NFT, they execute code stored in smart contracts that conform to different standards, such as ERC-721. This information is added to the blockchain where the NFT is being managed. The minting process, from a high level, has the following steps that it goes through: (i) creating a new block, (ii) validating information, and (iii) recording information into the blockchain.

Each token minted has a unique identifier that is directly linked to one Ethereum address. You can easily prove you own it. For example, let's say you purchase an NFT, and the ownership of the unique token is transferred to your wallet via your public address. The token proves that your copy of the digital file is the original. Your private key is proof-of-ownership of the original. The content creator's public key serves as a certificate of authenticity for that particular digital artefact. The creators public key is essentially a permanent part of the token's history. The creator's public key can demonstrate that the token you hold was created by a particular individual, thus contributing to its market value (vs a counterfeit).

You can sell NFTs, and in some cases this will earn the original creator resale royalties. Or, you can hold it forever, resting comfortably knowing your asset is secured by your wallet on Ethereum.

The creator of an NFT gets to decide the scarcity of their asset. For example, consider a ticket to a sporting event. Just as an organizer of an event can choose how many tickets to sell, the creator of an NFT can decide how many replicas exist. Sometimes these are exact replicas, such as 5000 General Admission tickets. Sometimes several are minted that are very similar, but each slightly different, such as a ticket with an assigned seat. In another case, the creator may want to create an NFT where only one is minted as a special rare collectible.

In these cases, each NFT would still have a unique identifier (like a bar code on a traditional "ticket"), with only one owner. The intended scarcity of the NFT matters, and is up to the creator. A creator may intend to make each NFT completely unique to create scarcity, or have reasons to produce several thousand replicas. Remember, this information is all public.

Some NFTs will automatically pay out royalties to their creators when they're sold. This is still a developing concept but it's one of the most powerful. Original owners of EulerBeats Originals earn an 8% royalty every time the NFT is sold on. And some platforms, like Foundation and Zora, support royalties for their artists. This is completely automatic so creators can just sit back and earn royalties as their work is sold from person to person. At the moment, figuring out royalties is very manual and lacks accuracy—a lot of creators don't get paid what they deserve. If your NFT has a royalty programmed into it, you'll never miss out.

Creators who upload their content and entities who populate their grids 100 may want to have an ability to sell selected content, whether it be an entire grids 100, containers 130 of a grid 100, nodes 140 of a container 100, partial content (frames or seconds) in a longer complete video snippet, etc. In an example, one could take a video collection in a container 130 and assign NFTs to it, such as a whole collection of LeBron James dunks and assign that container 130 with an NFT. That then becomes commoditized and exchangeable. In other words any grid 100, container 130, node 140, video snippet, fractional video snippet part, etc., having been designated with a NFT now becomes trackable and tradable. So the NFT can really be applied to any of grid 100, container 130, or node 140, or a video snippet that has been fractionalized and assigned fractional NFT parts, in which that video snippet could indeed have multiple owners (e.g., I just bought three seconds of this video clip; I bought seconds 10 through 12. That's my fractionalized token.).

While the example embodiments do not preclude conventional means of transferring creations for value (money, credit card payment, etc.), NFTs can come in is as an added feature for commoditizing content of the creator. So, if users of the application shown in FIGS. 11-13 wanted to create their work and package it into an NFT and sell it, we would actually sell it on their behalf through one of the NFT marketplaces, such as OpenSea, Axie Marketplace, Larva Labs/Crypto Punks (Nike), NBA Top Shot, Rarible, SuperRare, Foundation, Nifty Gateway, Mintable, Theta Drop, among others.

The example embodiments having been described, one of skill in the art would recognize alternative means for carrying out the invention, or other configurations. For example, and for clarity of explanation, system 700 is presented as including individual functional blocks including functional blocks labeled as a "processor" or processor 720. The functions these blocks represent may be provided through the use of either shared or dedicated hardware, including, but not limited to, hardware capable of executing software and hardware, such as a processor 720, that is purpose-built to operate as an equivalent to software executing on a general-purpose processor.

Alternatively, the functions of one or more processors presented in FIG. 3 may be provided by a single shared processor or multiple processors. (Use of the term "processor" should not be construed to refer exclusively to hardware capable of executing software.) Illustrative examples may include microprocessor and/or digital signal processor (DSP) hardware, read-only memory (ROM) 740 for storing software performing the operations described below, and random-access memory (RAM) 750 for storing results. Very large-scale integration (VLSI) hardware examples, as well as custom VLSI circuitry in combination with a general-purpose DSP circuit, may also be provided.

One or more parts of the example computer system or computing device 700, up to and including the entire computing device, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

Additionally, the processor 720 can include all types of processors disclosed herein, including a virtual processor. However, when referring to a virtual processor, the processor 720 includes the software components associated with executing the virtual processor in a virtualization layer and underlying hardware necessary to execute the virtualization layer. The system 700 can include a physical or virtual processor 720 that receive instructions stored in a computer-readable storage device, which cause the processor 720 to perform certain operations. When referring to a virtual processor 720, the system also includes the underlying physical hardware executing the virtual processor 720.

Further, the system as shown in FIG. 3 can also represent a virtual reality device. The device can be a headset that is entirely contained or can include a headset that receives a mobile device such as a Samsung device or an iPhone or other mobile device. In this regard, the features of FIG. 3 may include the components of such a headset. The communication interface 780 can provide a Wi-Fi, or cellular or other wireless communication means with other devices, access points, base stations, and so forth. Memory 730 can represent any standard memory used in the art as well as a secure element which can be used to store payment information and/or other user information in a secure manner for use in payment processes such as Apple Pay.

Exemplary hardware that can be used for the example embodiments includes computers, handheld devices, telephones (e.g., cellular. Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the method 1000 described herein.

In yet another embodiment, the disclosed method 1000 of FIG. 2 may be readily implemented in conjunction with software using object or object-oriented software development environments that provide portable source code that can be used on a variety of computer or workstation platforms. Alternatively, the disclosed system 700 of FIG. 3 may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus or device, or any suitable combination of the foregoing. A non-exhaustive list of specific examples for a computer-readable storage medium would include at least the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The present invention, in its various embodiments, configurations, and aspects, includes components, systems and/or apparatuses substantially as depicted and described herein, including various embodiments, sub-combinations, and subsets thereof. Those of skill in the art will understand how to make and use the present invention after understanding the present disclosure. The present invention, in its various embodiments, configurations, and aspects, includes providing devices in the absence of items not depicted and/or described herein or in various embodiments, configurations, or aspects hereof, including in the absence of such items as may have been used in previous devices, e.g., for improving performance, achieving ease and\or reducing cost of implementation.

Moreover, though the description herein has is of one or more embodiments, configurations, or aspects and certain variations and modifications, other variations, combinations, and modifications are within the scope of the example embodiments of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures to those claimed, whether or not such alternate, interchangeable and/or equivalent structures disclosed herein, and without intending to publicly dedicate any patentable subject matter.

We claim:

1. A method executed by one or more computing devices for performing a multi-dimensional search of video content accessible by a viewer thereof via an interactive navigation grid matrix to be displayed via a user interface to the viewer, the method comprising:

providing, via the user interface, a plurality of cells adapted to receive the video content so as to build out the interactive navigation grid matrix, the video content to be received for building out the interactive navigation grid matrix being non-live program video content, the plurality of cells including:

a plurality of differently named chapters of the video content, a plurality of differently named subchapters associated with each chapter, each subchapter representing a sub-title of video content that is different from video content represented by the other differently named subchapters under their corresponding chapter, the plurality of chapters and subchapters forming headers of the plurality of cells in a multiple column by multiple row arrangement as two dimensions of the interactive navigation grid matrix, a plurality of containers of video content associated with each subchapter, the containers representing a third dimension of an enhanced three-dimensional interactive navigation grid matrix, each of the containers accessible within a corresponding subchapter of a given corresponding chapter, and a plurality of nodes of video snippets associated with each container under a given subchapter, displaying via the user interface the enhanced three-dimensional interactive navigation grid matrix for the viewer, and enabling a viewer to conduct a multi-dimensional search of the video content, the providing, displaying and enabling steps being performed by computer software adapted to run on computer hardware.

2. The method of claim 1, wherein the plurality of cells are one of an auto-populated plurality of cells of video content, and a plurality of empty cells fillable via insertion by the viewer.

3. The method of claim 1, wherein each node represents one or more instances of video snippets accessible within its corresponding container of a given subchapter.

4. The method of claim 1, wherein each node in a container is further composed of:
one or more instances of video snippets,
metadata corresponding to the one or more instances of video snippets that forms the snippet, and
a reference to a source of each instance of a video snippet of content.

5. The method of claim 1, wherein enabling a viewer to conduct a multi-dimensional search is performed across all three dimensions of the grid matrix.

6. The method of claim 1, wherein enabling a viewer to conduct a multi-dimensional search is performed via a structured drill-down to search all nodes of a given container.

7. The method of claim 1, wherein one or more of the nodes is embodied as a scannable entity such as a QR code or bar code that references a source of the digital content for the node.

8. The method of claim 7, wherein the QR code includes one or more hashtags captured therein representing an element of a given node, or a node link between a node source and its node.

9. The method of claim 1, wherein any of an interactive navigation grid matrix, a container therein, a node within the container, and any video snippet of the node or fractional video snippet part of the node thereof is tokenized so as to be designated as a non-functional token (NFT) that is trackable and tradable.

10. The method of claim 1, wherein
the plurality of cells are populated with the video content in real time, and the enhanced three-dimensional interactive navigation grid matrix displayed to the viewer enables creation of personalized video entertainment pulled from the three dimensions thereof.

11. A computer system adapted for performing a multi-dimensional search of video content accessible by a viewer thereof via an interactive navigation grid matrix to be displayed via a user interface for the viewer, the system comprising:

a processing hardware set, and a computer-readable storage device medium, wherein the processing hardware set is structured, connected and/or programmed to run program instructions stored on the computer-readable storage medium instructions and associated data, the program instructions including:

an ingestion module programmed to provide, via the user interface, one of an automatically populated plurality of cells of video content or a plurality of empty cells fillable by enabling the viewer to insert video content therein, the video content being non-live program video content, an insertion module programmed to auto-populate, or receive insertions by the viewer, for the video content so as to build out the interactive navigation grid matrix, the plurality of cells including:

a plurality of differently named chapters of the video content, a plurality of differently named subchapters associated with each chapter, each subchapter representing a sub-title of video content that is different from video content represented by the other differently named subchapters under their corresponding chapter, the plurality of chapters and subchapters forming headers of the plurality of cells in a multiple column by multiple row arrangement as two dimensions of the interactive navigation grid matrix, a plurality of containers of video content associated with each subchapter, the containers representing a third dimension of an enhanced three-dimensional interactive navigation grid matrix, each of the containers accessible within a corresponding subchapter of a given corresponding chapter, and a plurality of nodes of video snippets associated with each container under a given subchapter, a display module programmed, via the user interface, to display the enhanced three-dimensional interactive navigation grid matrix for the viewer, and a processing module programmed to enable a viewer to conduct a multi-dimensional search of the video content.

12. The computer system of claim 11, wherein each node represents one or more instances of video snippets accessible within its corresponding container of a given subchapter.

13. The computer system of claim 11, wherein each node in a container is further composed of:
one or more instances of video snippets,
metadata corresponding to the one or more instances of video snippets that forms the snippet, and
a reference to a source of each instance of a video snippet of content.

14. The computer system of claim 11, wherein the processing module either:
enables a viewer to conduct a multi-dimensional search across all three dimensions of the grid matrix, or
performs the search via a structured drill-down to search all nodes of a given container.

15. The computer system of claim 11, wherein one or more of the nodes is embodied as a scannable entity such as a QR code or bar code that references a source of the digital content for the node.

16. The method of claim 15, wherein the QR code includes one or more hashtags captured therein representing an element of a given node, or a node link between a node source and its node.

17. The computer system of claim 11, wherein any of an interactive navigation grid matrix, a container therein, a node within the container, and any video snippet of the node or fractional video snippet part of the node thereof is tokenized so as to be designated as a non-functional token (NFT) that is trackable and tradable.

18. A method executed by one or more computing devices for providing the ability to conduct a multi-dimensional search of video content accessible by a viewer thereof via an interactive navigation grid matrix to be displayed via a user interface to the viewer, the method comprising:
   providing a plurality of cells adapted to receive the video content in real time so as to populate the plurality of cells with the video content and build out the interactive navigation grid matrix, the video content being non-live program video content, the plurality of cells including:
      a plurality of differently named chapters of the video content,
      a plurality of differently named subchapters associated with each chapter, each subchapter representing a sub-title of video content that is different from video content represented by the other differently named subchapters under their corresponding chapter,
      a plurality of containers of video content associated with each subchapter, the containers representing a third dimension of an enhanced three-dimensional interactive navigation grid matrix, and
      a plurality of nodes associated with each container under a given subchapter, and
   displaying the enhanced three-dimensional interactive navigation grid matrix for the viewer so that the viewer is able to create personalized video entertainment that has been pulled from the three dimensions of the enhanced three-dimensional interactive navigation grid matrix,
   the providing and displaying steps being performed by computer software adapted to run on computer hardware,
   wherein any of the enhanced three-dimensional interactive navigation grid matrix, a container therein, a node within the container, and any video snippet of the node or fractional video snippet part of the node thereof is tokenized so as to be designated as a non-functional token (NFT) that is trackable and tradable.

19. The computer system of claim 11, wherein
the plurality of cells are populated with the video content in real time, and
the enhanced three-dimensional interactive navigation grid matrix displayed to the viewer enables creation of personalized video entertainment pulled from the three dimensions thereof.

* * * * *